United States Patent

Raszkowski et al.

[11] Patent Number: 5,934,436
[45] Date of Patent: Aug. 10, 1999

[54] ACTUATOR MECHANISM FOR A TRANSMISSION PARKING PAWL AND SELECTOR VALVE

[75] Inventors: James Allen Raszkowski, Indianapolis; William S. Reed, Greenfield, both of Ind.

[73] Assignee: General Motors Corporation, Detroit, Mich.

[21] Appl. No.: 09/103,870

[22] Filed: Jun. 24, 1998

[51] Int. Cl.[6] .................................................. B60K 41/26
[52] U.S. Cl. ..................... 192/219.5; 74/104; 74/473.28; 188/31
[58] Field of Search ........................... 192/219.5; 188/31, 188/69; 74/104, 473.28

[56] References Cited

U.S. PATENT DOCUMENTS

| | | |
|---|---|---|
| 3,119,594 | 1/1964 | Heggem ................................ 74/104 X |
| 3,912,050 | 10/1975 | Iwanaga et al. ........................ 188/69 |
| 4,690,011 | 9/1987 | Sakai et al. ........................ 74/473.27 |
| 4,719,999 | 1/1988 | Ohkubo ................................ 192/219.5 |
| 4,907,681 | 3/1990 | Kuusik et al. . |
| 5,685,406 | 11/1997 | Drum et al. . |
| 5,794,748 | 8/1998 | Heuver et al. ........................ 188/31 X |

*Primary Examiner*—Rodney H. Bonck
*Attorney, Agent, or Firm*—Donald F. Scherer; Jeffrey A. Sedlar

[57] ABSTRACT

A power transmission has a parking pawl which is engageable with a toothed member on the transmission output shaft to prevent rotation of the output shaft when the parking pawl is set. The pawl is manipulated by a manual selector shaft and a detent plate. The detent plate is also drivingly connected with a transmission range selector valve through a pin which engages an annular groove in the selector valve. The pin is driven by a cam on the detent plate and is guided in a pair of longitudinal slots formed on the valve body which slidably houses the selector valve.

6 Claims, 3 Drawing Sheets

5,934,436

ACTUATOR MECHANISM FOR A TRANSMISSION PARKING PAWL AND SELECTOR VALVE

TECHNICAL FIELD

This invention relates to actuator mechanisms for power transmissions having a parking pawl and a range selector valve.

BACKGROUND OF THE INVENTION

Most automatic transmission systems include a parking mechanism and a manual selector valve or a range selector valve. These two mechanisms are controlled by a rotary input shaft which is connected through linkage or cable with an operator in the vehicle. The park system in a majority of vehicles is a longitudinally movable bullet type cam arrangement which forces pivotal movement of a parking pawl into engagement with a gear secured to a transmission output shaft.

It is also known to utilize roller mechanisms disposed between a housing and a parking pawl to force engagement of the parking pawl. In these systems, the housing member is generally secured to the transmission housing and also pivotally mounts the parking pawl member.

The drive connection between the detent plate and the parking pawl actuator is generally a rod which is movable in a substantially straight line with rotation of the detent plate. The detent plate also drives a selector valve to the drive position determined by the operator. For example, the operator will select Park, Reverse, Neutral or Drive.

In a number of power transmission systems, the connection between the detent plate and the selector valve is a rod or link which has substantially linear movement to input the movement to the selector valve. It is also known to use a cam slot on the detent plate with a drive pin connected between the cam slot and the selector valve. In these instances, the pin is generally guided in a single slot on the valve body housing the selector valve and is secured with the manual valve in a recess or aperture formed in the valve.

SUMMARY OF THE INVENTION

It is an object of this invention to provide an improved actuator mechanism for controlling the park linkage and positioning of the range selector valve.

In one aspect of this invention, the actuator mechanism includes a drive pin operatively connected between a cam slot on a detent plate and an annular recess in the selector valve.

In another aspect of this invention, the drive pin is guided in spaced longitudinally extending slots which are formed in a valve body slidably housing the selector valve in a bore.

In yet another aspect of this invention, the slots are disposed on opposite sides of the selector valve bore.

In a further aspect of this invention, the park pawl linkage includes a return spring and a guide housing, both of which are at least partially retained by an end cover of the transmission.

In yet a further aspect of this invention, the park pawl return spring has a U-shaped end disposed in a recess formed in the transmission housing with one end of the spring engaging a wall of the recess to inhibit inadvertent removal of the spring from the recess.

In still a further aspect of this invention, the park pawl return spring U-shaped end is compressed at installation in the recess such that a tension force is generated between the spring end and the recess wall.

DESCRIPTION OF THE PREFERRED EMBODIMENT

Figure 1:
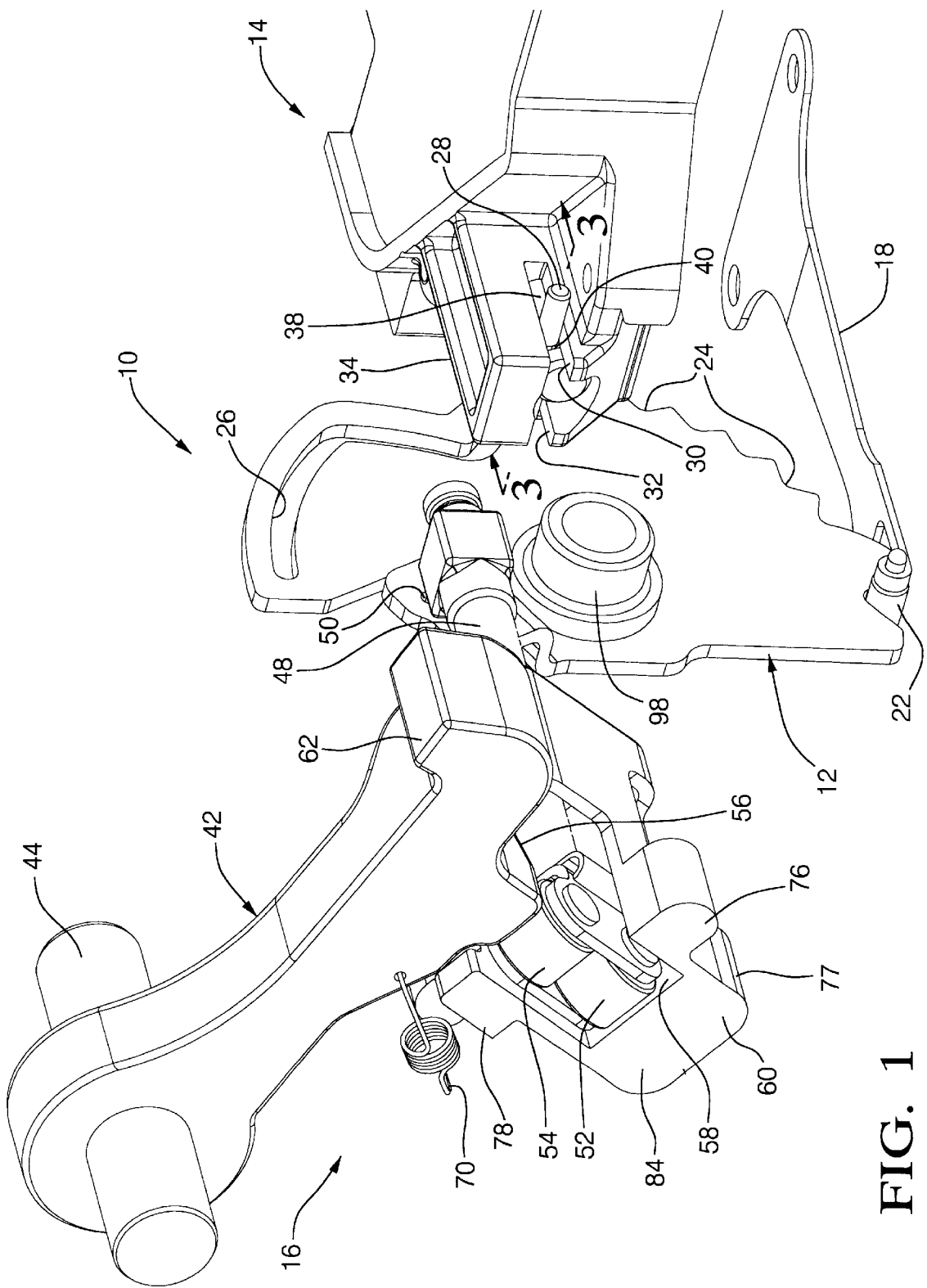
FIG. 1 is an isometric view of an actuator mechanism with the transmission housing cover removed.

Referring to the drawings, wherein like characters represent the same or corresponding parts throughout the several views, there is seen an actuator mechanism 10 which includes a detent plate or rooster comb 12, a selector valve assembly 14 and a park assembly or mechanism 16. A detent spring 18, which has rotatably connected therewith a detent roller 22, engages a plurality of detent notches 24 formed on the detent plate 12.

The detent spring 18 and roller 22 are operable in combination with the detent notches 24 to maintain the rooster comb in a selected position. The rooster comb or detent plate 12 also has formed therein a cam slot 26 which drivingly engages a drive pin 28. The drive pin 28 is slidably disposed in a pair of slots 30, 32, which are formed in a portion 34 of a valve body 36. Slidably disposed in the valve body 36 is a range selector or control valve 38. The range selector or control valve 38 is a conventional well known item used in automatically shifting transmissions to permit the operator to select the range in which he desires the transmission to operate. The slots 30,32 are on diametrically opposite sides of the valve 38.

Figure 3:
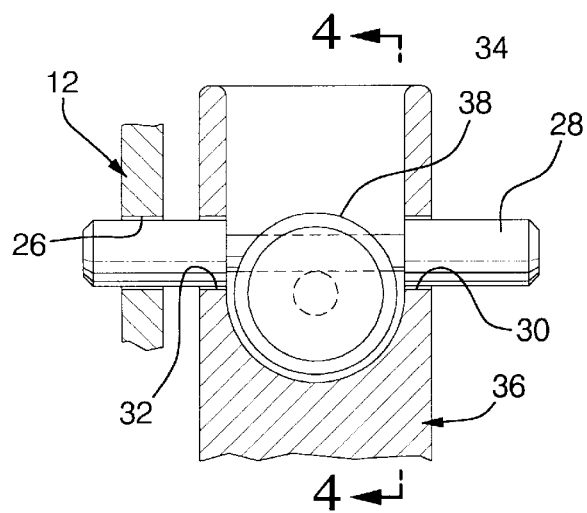
FIG. 3 is a view taken along line 3—3 of FIG. 1.
Figure 4:
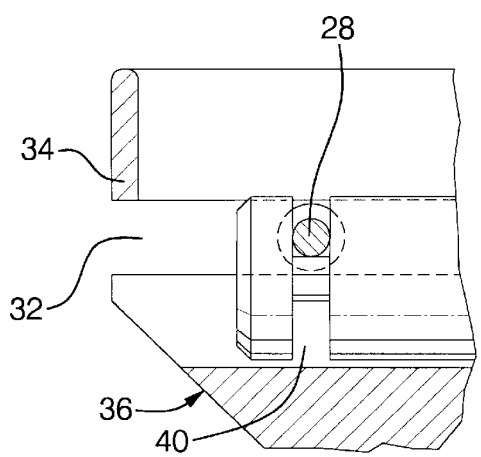
FIG. 4 is a view taken along line 4—4 in FIG. 3.

The control valve 38 has formed therein an annular groove 40 in which the drive pin 28 is positioned. As best seen in FIGS. 3 and 4, the drive pin 28 freely rests in the groove 40 and is guided in the slots 30 and 32. Thus, the side load effect from the cam slot 26 is absorbed by the valve body portion 34 and does not side load the valve 38. This ensures that the operating forces required to move the valve longitudinally are minimal and provide the minimum amount of input force to the operator.

The park mechanism 16 includes a park pawl 42 which is rotatably mounted on a support rod or shaft 44 which, in turn, is positioned in a transmission housing 46. In the alternative, the park pawl 42 and rod 44 can be movable in unison and the rod 44 will be rotatably supported in the housing 46. Both of these systems are well known.

The park mechanism 16 further includes a park actuator rod 48 which is drivingly connected at a slot 50 to the detent plate 12. The park actuator rod 48 includes a conventional lost motion spring mechanism (not shown). These devices and their use of parking systems is well known. The park actuator rod 48 also has rotatably disposed thereon a pair of rollers 52 and 54 which rotatably engage each other and the roller 54 engages a substantially curved surface 56 formed on the parking pawl 42. The roller 52 engages a control ramp 58 formed in a guide housing 60.

Figure 2:
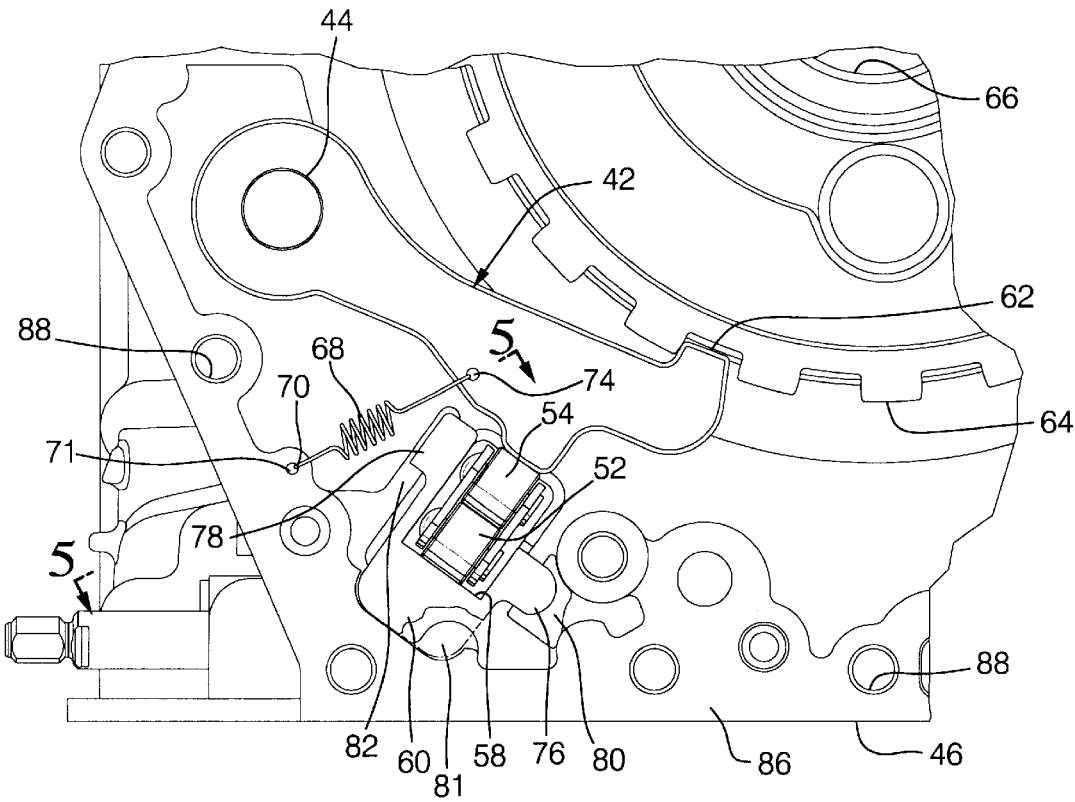
FIG. 2 is an end view of a transmission with the covers removed to show a portion of the actuator mechanism.
Figure 5:
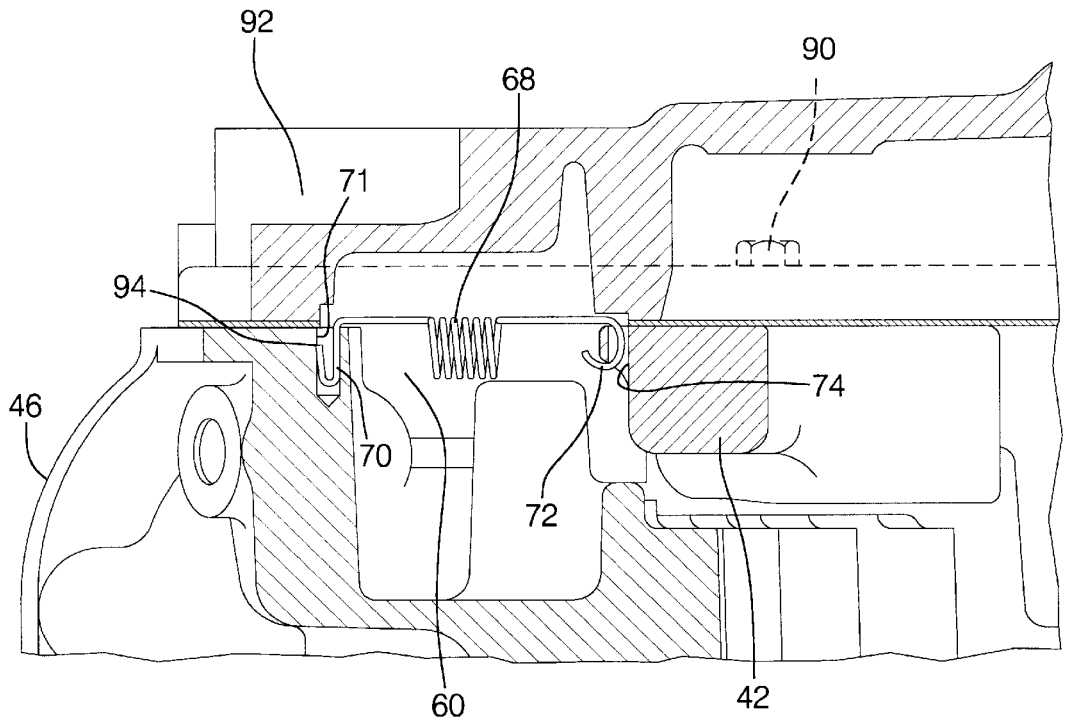
FIG. 5 is a view taken along line 5—5 in FIG. 2 with the side cover in place.

As best seen in FIG. 2, the park pawl 42 has a pawl tooth 62 which is effective to engage between teeth on a park gear 64. The use of a parking pawl within a transmission to halt or prevent rotation of a transmission output shaft 66 is well known in the art of power transmissions. The park pawl 42 is urged out of engagement with the park gear 64 by a gear separating force and a return spring 68 which, as best seen in FIG. 5, has one end 70 disposed in an aperture or recess 71 in the housing 46 and the other end 72 disposed in an aperture 74 formed in the park pawl 42. This force and spring, as previously mentioned, are effective to urge the park pawl 42 away from engagement with the park gear 64 when the detent plate 12 is moved from the park position.

The guide member 60 has a pair of locating ears 76, 77 and 78 which abut respective ledges 80, 81 and 82 machined into the housing 46. The guide 60 has a flat end surface 84 which is disposed in flush or line relationship with a side face 86 of the transmission housing 46. This is the same side face in which the aperture 71 is formed. This side face has a plurality of threaded openings 88 which will engage with threaded fasteners 90 when a cover 92 is placed on the transmission side surface 86.

When the cover 92 is in position and held therein by the fasteners 90, the guide 60 is abutted by the cover such that the guide cannot move longitudinally out of the transmission and at the same time the guide 60 is prevented from moving inward by the action between the ledges 80, 81 and 82 and the ears 76, 77 and 78. Thus, the guide member is located in the transmission housing 46 without the use of additional fasteners or pins or other securement means other than the guide member surfaces and the end cover. This provides for simplicity of manufacture and installation.

The cover 92 is also disposed in close proximity with the end 70 of the return spring 68, thus inhibiting the spring 68 from moving outward from the transmission housing 46. Further, it can be noted in FIG. 5 that the spring end 70 is compressed in the aperture or recess 71 and the spring end 70 has a terminus point 94 which is disposed in piercing engagement with the wall of the aperture 71. This further inhibits the return spring 68 from being inadvertently dislodged from the transmission housing.

Figure 6:
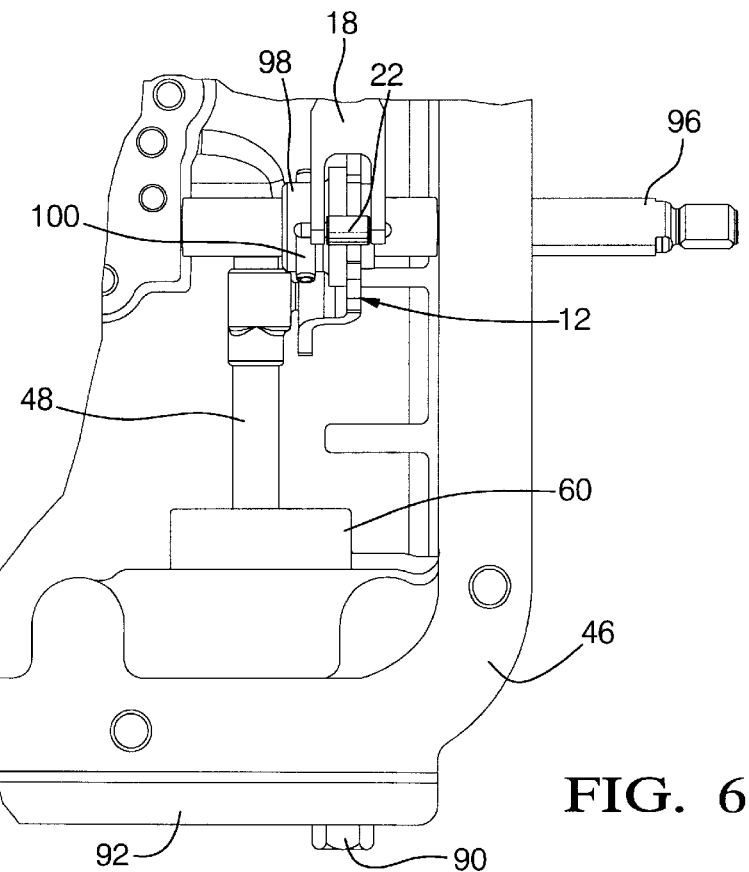
FIG. 6 is a bottom view of the transmission showing a portion of the actuator mechanism with the side cover in place.

As best seen in FIG. 6, the detent plate 12 is rotatably connected with a manual selector shaft 96 which is secured to the detent plate 12 through a collar 98 and a pin 100.

From the above description, it should be appreciated that the park actuator mechanism and the selector valve actuator mechanism provide a compact structure which permits simple assembly procedures in that the guide housing 60 and the manual selector valve 38 do not require the use of mechanical securements for their positioning or for their operation. That is to say, the selector valve 38, while mechanically driven by the pin 28, does not have a fixed connection therewith. The slot within the valve 38 permits some movement of the pin 28 relative thereto to prevent the binding of the valve as previously discussed.

We claim:

1. An actuator apparatus for a selector valve and park mechanism in a power transmission comprising:

a selector shaft rotatably mounted in a transmission housing;

a detent plate connected with said selector shaft;

a cam profile formed on said detent plate;

a selector valve slidably disposed in a valve body, said valve body having spaced linearly extending slots at substantially diametrically opposed sides of said selector valve, said selector valve having a recess formed thereon, said recess being aligned with said slots; and a drive pin extending from said cam profile and being driven thereby, and said pin being disposed in both said slots and in said recess to effect linear movement of said selector valve upon rotary movement of said selector shaft.

2. The actuator apparatus for a selector valve and park mechanism defined in claim 1 further comprising:

a park actuator rod operatively connected with said detent plate to enforce actuation of a park pawl rotatably mounted in the transmission housing;

a guide member positioned in the transmission housing and supporting a roller on said park actuator rod, said guide member having a locating surface engaging a portion of the transmission housing to ensure positioning of the guide member in the transmission housing and an end surface abutted by a transmission housing cover to ensure securement of said guide member in said transmission housing.

3. The actuator apparatus for a selector valve and park mechanism defined in claim 2 further comprising:

a spring having a first end engaged with said pawl and a second substantially U-shaped end disposed in engaging relation with a recess formed in the transmission housing, and the transmission housing cover being disposed in close proximity to said second spring end to prevent disengagement of said second spring end from said recess.

4. The actuator apparatus for a selector valve and park mechanism defined in claim 3 wherein said U-shaped end has a terminus pricking a wall of said recess and said first end having a hook portion enmeshed with an aperture in said pawl.

5. An actuator apparatus for a selector valve and park mechanism in a power transmission comprising:

a selector shaft rotatably mounted in a transmission housing;

a detent plate connected with said selector shaft;

a cam profile formed on said detent plate;

a selector valve slidably disposed in a valve body;

a drive pin extending from said cam profile and being driven thereby, and said pin drivingly engaging said selector valve;

a guide disposed in the housing, having locating portions abutting cooperating portions in the housing and being retained in the housing by a cover secured to the housing;

a park actuating mechanism having an actuator rod drivingly connected with said detent plate, an actuator pawl pivotally mounted in the housing and partially disposed in said guide, and a pair of rollers attached to said actuator rod and abutting said guide and said pawl respectively to urge a tooth on said pawl into locking engagement with a gear secured with an output shaft of the transmission and a return spring attached between said pawl and the housing to urge said pawl out of engagement with said gear.

6. The actuator apparatus for a selector valve and park mechanism defined in claim 5 wherein said return spring has a U-shaped end frictionally engaging the housing in a recess formed therein, and said cover being disposed in close proximity with said U-shaped end to inhibit disengagement of said U-shaped end from said recess.

* * * * *